United States Patent [19]

Lockyear

[11] 4,410,845

[45] Oct. 18, 1983

[54] BACKSPIN DETECTION CIRCUIT FOR A SUBMERSIBLE PUMP

[75] Inventor: Kevin W. Lockyear, San Jose, Calif.

[73] Assignee: Hughes Tool Company, Houston, Tex.

[21] Appl. No.: 307,558

[22] Filed: Oct. 1, 1981

[51] Int. Cl.³ .............................................. H02P 3/18
[52] U.S. Cl. .................................. 318/459; 318/368; 318/798; 361/28; 417/45
[58] Field of Search ................................. 361/24–29, 361/31, 32, 82, 83; 307/127; 417/18–21, 45; 318/459, 368, 798, 806

[56] References Cited

U.S. PATENT DOCUMENTS

| | | | |
|---|---|---|---|
| 3,439,245 | 4/1969 | Perone | 318/459 |
| 3,728,604 | 4/1974 | Grygera | 318/459 |
| 3,875,463 | 4/1975 | Reuter et al. | 361/29 |
| 4,000,446 | 12/1976 | Vandevier et al. | |
| 4,021,700 | 5/1977 | Ellis-Anwyl | |

*Primary Examiner*—David Smith, Jr.
*Attorney, Agent, or Firm*—Robert A. Felsman; James E. Bradley

[57] ABSTRACT

A motor control circuit for submersible pumps has features to prevent restarting while the electric motor is backspinning. The circuit includes a sensor for sensing the voltage produced by the residual magnetism in the rotor of the motor while it backspins. The voltage sensed is amplified, then rectified and compared with a reference voltage that is preset. The reference voltage corresponds to a voltage produced during backspinning at a selected maximum amount tolerable when restarting. The DC pulses are filtered to provide a corresponding voltage, then compared to the reference voltage. The control circuit is disabled from allowing a restart, either manual or automatic, when the corresponding voltage is greater than the reference voltage.

5 Claims, 2 Drawing Figures

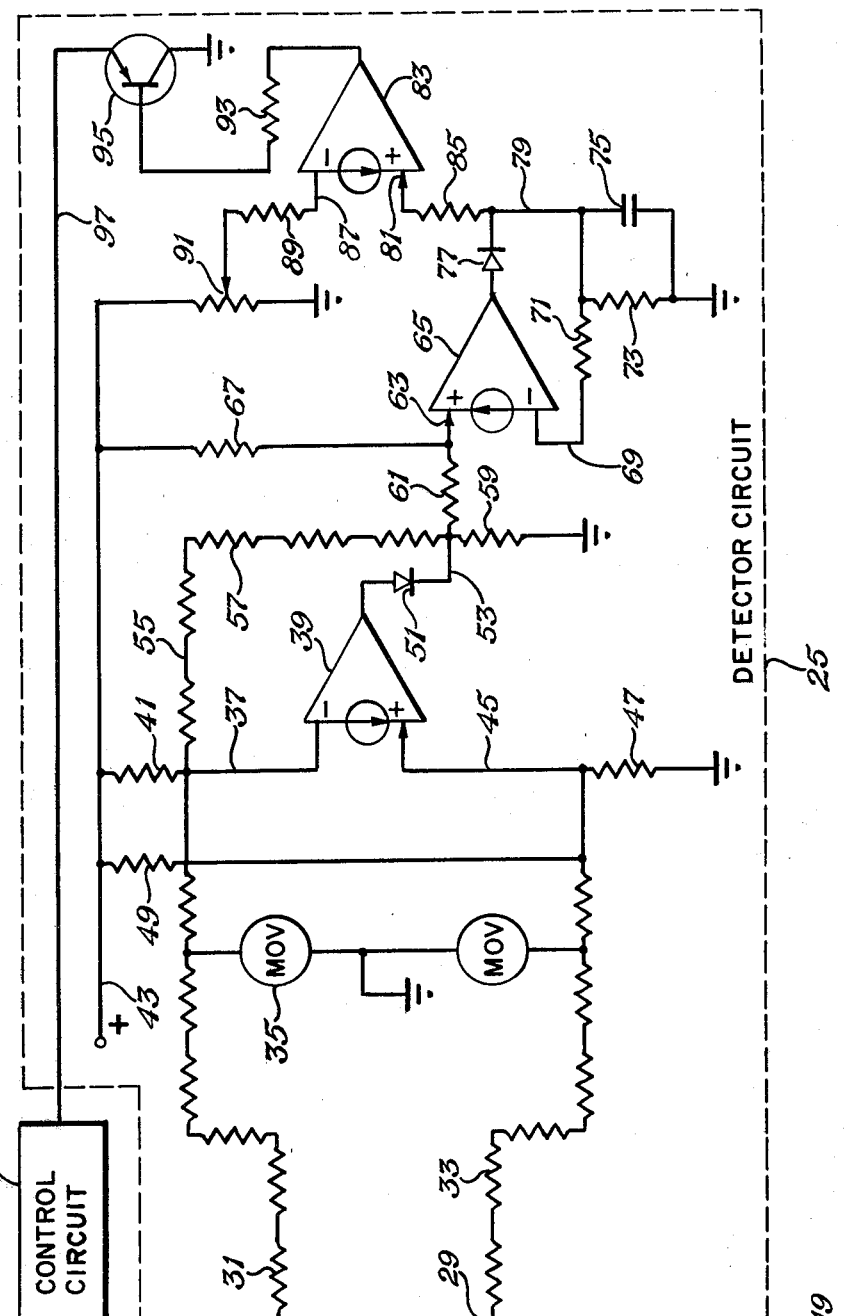

BACKSPIN DETECTION CIRCUIT FOR A SUBMERSIBLE PUMP

BACKGROUND OF THE INVENTION

This invention relates in general to submersible pumps and in particular to an electrical circuit for preventing restarting of the pump motor while the pump is backspinning.

Submersible pumps are often used in deep wells for pumping large volumes of liquid to the surface. Often, the pump assembly will be located several thousand feet into the well. The pump assembly normally includes a centrifugal pump, below which is mounted a large alternating current electrical motor for driving the pump.

For various reasons, pumps are often automatically shut down. This could be due to momentary overload or power fluctuations. When the power to the electrical motor is cut off, the motor will continue to spin along with the pump in a forward direction for a period of time due to the momentum. Then, the motor will cease spinning in a forward direction and start backspinning. The spinning in the reverse direction is due to the column of liquid above the pump falling downward into the well. Depending on the well, several thousand feet of liquid above the pump may drop past the pump.

It is important that while the motor is backspinning at a fairly high rate that no attempt be made to start the motor. Some circuits have automatic starting devices that may attempt restarting without being aware of backspinning. Also, field personnel may be present that might attempt to manually start the motor while the motor is backspinning. The sudden surge of power to the motor for starting while it is backspinning creates extremely high torque on the shaft and may cause the motor shaft to twist in two.

SUMMARY OF THE INVENTION

A backspin detection circuit is provided to sense when the motor is backspinning and to disable the motor control circuit from starting the motor until the motor essentially ceases to backspin. The system includes sensing means for sensing backspin voltage that is generated by residual magnetism in the motor. A voltage corresponding to the sensing means is provided, which is then compared to a reference voltage to determine whether or not the motor has ceased backspinning sufficiently for restarting. The reference voltage has a value that is proportional to a voltage produced by the motor while backspinning at a selected maximum amount that is tolerable while restarting.

In the preferred embodiment the voltage sensed by backspinning is amplified and converted into DC pulses. These pulses are filtered and compared to the level reference voltage. If the amplitude of the filtered pulses exceeds the reference voltage, an amplifier and transistor disable the motor from starting.

BRIEF DESCRIPTION OF THE DRAWINGS

FIG. 1 is an electrical schematic illustrating the backspin detection circuit of this invention.

FIG. 2 illustrates typical inputs during backspinning to the output amplifier of the circuit of FIG. 1.

DESCRIPTION OF THE PREFERRED EMBODIMENT

Block 11 of FIG. 1 represents a three-phase power supply having three outputs, each of which provides an alternating voltage (varying in sinusoidal fashion) on the same RMS or root-means square amplitude and the same alternating frequency of 60 HZ (cycles per seconds). The three alternating voltages are phase-displaced with respect to each other by 120 degrees. These outputs are passed over lines 13, 15, and 17 to a motor 19 located at the bottom of the well. Since there is no neutral wire, each of the phase voltages is actually a line-to-line voltage and appears or is produced at one output of supply 11 relative to another of its outputs. The magnitude of each phase voltage depends upon the characteristics of the motor, and 2400 volts or more is common.

A switch or contactor 21 for each line 13, 15 and 17 is located uphole. Switches 21, which enable power from supply 11 to reach motor 19, are controlled by a control circuit 23. Control circuit 23 is a circuit for protecting the motor 19. It will cause switches 21 to open either under an underload or overload condition. Suitable control circuits are shown in U.S. Pat. No. 4,000,446 issued Dec. 28, 1976 to Joseph E. Vandevier and David R. Ellis-Anwyl and U.S. Pat. No. 4,021,700 issued May 3, 1977 to David R. Ellis-Anwyl, all of which material is hereby incorporated by reference.

Block 25 represents a detector circuit for detecting whether or not motor 19 is backspinning after contactors 21 have been opened, and for preventing the control circuit 23 from again closing contactors 21 if the motor is still backspinning. The detector circuit includes two leads 27 and 29 that are connected to two of the power conductors or lines, which in the drawing are shown to be lines 15 and 17. The detector circuit 25 is located uphole with control circuit 23, and the lines 27 and 29 are connected uphole to lines 15 and 17, but between contactors 21 and motor 19. Six 1.2 megohm resistors 31 are connected in series in line 27. Similarly, six 1.2 megohm resistors 33 are connected in series in line 29. Two metal oxide varistors 35 are connected in series between lines 27 and 29 at a point between the fifth and sixth resistors 31 and 33. The connection between the varistors 35 is grounded. Varistors 35 appear open at low voltages and short circuited at high voltages to provide surge protection against extremely high voltages, such as if lightning struck the system.

Line 27 leads to a negative input line 37 of a high gain differential amplifier 39. Input line 37 is also connected through a resistor 41 to a line 43 supplied with DC (direct current) power. Voltage sensing line 29 is connected to the positive input line 45 of amplifier 39. Input line 45 is connected through a resistor 47 to ground. Input line 45 is also connected through a resistor 49 to the DC power source line 43. A diode 51 has its anode connected to the output of amplifier 39 and its cathode connected to a line 53. A line 55 extends from the input line 37 of amplifier 39 to the cathode of diode 51. Six resistors 57 are placed in series in line 55. Line 53 is grounded through a resistor 59. The AC (alternating current) voltage sensed by lines 27 and 29 is amplified and converted to square DC pulses at line 53.

Line 53 also leads to a resistor 61 which in turn is connected to the positive input 63 of a differential amplifier 65. Input 63 is connected to the DC power line 43 through a resistor 67. The negative input 69 of amplifier 65 is connected through a resistor 71 to a time constant means, low pass filter, or integrating circuit comprised of a resistor 73 and capacitor 75 connected in parallel with each other and to ground. The RC circuit of resistor 73 and capacitor 75 has preferably a 5 to 10 second time constant to smooth the output pulses from amplifier 65. Resistor 73 allows the charge in capacitor 75 to bleed slowly off to ground after it is charged by each output pulse from amplifier 65.

The output of amplifier 65 is connected to the anode of a diode 77, the cathode of which is connected to a line 79. Line 79 is connected to the RC circuit comprising resistor 73 and capacitor 75 and also connected to the positive input 81 of a differential amplifier 83 through a resistor 85. The negative input 87 to amplifier 83 is connected through a resistor 89 to the wiper of a potentiometer 91. Potentiometer 91 is connected between the DC power supply line 43 and ground to provide a variable, positive, level voltage to input 87 of amplifier 83.

Potentiometer 91 can be set to provide a DC level to amplifier 83 that corresponds to voltage produced by the motor when backspinning at the maximum amount tolerable for restarting, such as about 5 RPM (revolutions per minute). This threshold or reference voltage can be empirically determined. Amplifier 83, as well as amplifiers 39 and 65, amplifies the potential between its inputs. If positive input 81 is more positive than negative input 87, the output will be saturated at the DC supply voltage. If positive input 81 is more negative than negative input 87, then the output will be saturated to the negative supply voltage which is ground.

The output of amplifier 83 is connected through a resistor 93 to the base of a transistor 95. Transistor 95 is a PNP transistor, with its emitter connected to the control circuit through a line 97. The collector of the transistor is connected to ground. If the voltage at the base of transistor 95 is low (ground), transistor 95 will conduct. If the base voltage is high (supply voltage), it will not conduct. Control circuit 23 is disabled from providing a signal to close contactors 21 unless transistor 95 is conducting to provide a ground return for control circuit 23.

In operation, assume first that the rotor of motor 19 is turning in the forward direction and that contactors 21 are closed, supplying power to the motor 19. In this mode, full line voltage will be sensed by leads 27, 29. This voltage will be dropped through the resistors 31 and 33 to approximately 15 to 50 volts at the input terminals 37 and 45 of amplifier 39. Amplifier 39 will produce a saturated square wave corresponding to the frequency of the motor, normally 60 HZ. This provides a waveform at the output of amplifier 65 and to the positive input 81 of amplifier 83. Amplifier 83 will compare the amplitude of this waveform to the DC voltage supplied by the potentiometer 91 to input 87. The waveform at input 81 will be greater than the DC level at input 87 causing the output from amplifier 83 to be positive. Transistor 95 will be in a nonconducting mode, thus the control circuit 23 is disabled from providing a restarting signal.

Then assume that for various reasons, the control circuit 23 opens contactors 21, removing power from conductors 13, 15 and 17. Voltage will continue to be generated by residual magnetism present in the rotor of the motor as it spins in the forward direction. This voltage is sensed by leads 27 and 29 and amplified through amplifiers 39 and 65. Diodes 51 and 53 provide a square pulse output on line 53 and line 79 of frequency the same as the rotational speed off the motor. The time constant provided by resistors 73 and capacitor 75 is selected to provide a long decay time for each pulse. Instead of separate pulses, with zero voltage between them, the decay of each pulse is sufficiently long during forward free spinning so that the waveform or corresponding voltage will not return to zero. As the forward spinning decreases in speed, the result will be the waveform 99 shown in FIG. 2, having a fluctuating amplitude, with peak amplitude at the pulses. As long as the amplitude of the waveform 99 does not drop below the DC reference voltage 101 provided by potentiometer 91, the output from the amplifier 83 will still be positive and the control circuit will be disabled from providing a restart pulse to close contactors 21.

Soon, the motor will cease its forward spinning direction and pause for an instant. At this instant, there will be no voltage potential between lines 27, 29. However, the time constant of the resistor 73 and capacitor 75 is selected so that the amplitude of the pulses generated by the forward direction rotation will not decay lower than the reference voltage 101, and amplifier 83 will not momentarily turn on transistor 95.

After pausing for an instant, the column of liquid above the pump will begin to drop to proceed back into the well formation. As it drops, it causes the pump to spin in reverse direction, which in turn spins the rotor of motor 19. Residual magnetism in the rotor creates an AC voltage potential that is sensed by lines 27 and 29. The voltage generated drops in frequency and amplitude as the speed of rotation drops. As in the forward direction, this voltage potential is amplified and rectified by amplifier 39 and applied to the peak detector or amplifier 65 which filters out the pulsating generating signal by use of the RC circuit. This corresponding voltage or waveform 99 is compared against the threshold voltage 101. As long as the amplitude of the waveform 99 does not drop below reference voltage 101, then the differential amplifier 83 will not cause transistor 95 to conduct.

When the backspin has slowed down enough to produce less than about 90 millivolts RMS, which may be at 20 RPM or less, amplifier 39 will begin operating in its linear region and producing a sine wave with a frequency matching the turning rotor and an amplitude proportional to the frequency. The RC circuit formed by resistor 73 and capacitor 75 provides waveform 99 to the amplifier 83. Once the peak amplitude of waveform 99 drops below the reference voltage 101, then amplifier 83 will provide a constant negative output to cause transistor 95 to conduct, providing a ground for control circuit 23 and enabling control circuit 23 to send a signal to close contactors 21.

Reference voltage 91 is selected to be low enough such that the motor will be essentially no longer spinning when the peak amplitude of the voltage generated by the spinning rotor and applied to amplifier 83 drops below the reference voltage. The time constant of the RC circuit of resistor 73 and capacitor 75 is selected so that the waveform 99 will not drop below the reference voltage 101 during the pause from the forward spinning to the back spinning.

Leads 27 and 29, along with resistors 31 and 33 serve as sensing means for sensing backspin voltage generated by the motor while backspinning and providing a corresponding voltage to amplifier 39. Potentiometer 91 and resistor 89, along with the DC voltage supplied through power line 43 serve as reference means for providing a reference voltage proportional to a voltage produced by the motor 19 while backspinning at a selected maximum amount tolerable when restarting. Amplifier 83 serves as comparison means for comparing the corresponding voltage produced at input line 81 to the reference voltage produced at input 87. Transistor 95 serves as disabling means for preventing restarting when the corresponding voltage exceeds the reference voltage, and enabling restarting when the corresponding voltage drops below the reference voltage.

Amplifiers 39 and 65 serve as amplifying means for amplifying the AC voltage sensed from the backspinning of the rotor of motor 19 and for producing direct current voltage pulses. The time constant circuit comprised of resistor 73 and capacitor 75 serves as integration means for integrating the square pulses to provide a corresponding voltage to amplifier 83 that is proportional to the amplitude of the square pulses and eliminates zero separation between the pulses. More particularly, the resistor 73 and capacitor 75 serve as time constant means for providing each of the square pulses with a decay time constant of selected duration to result in a corresponding voltage level to be applied to the amplifier 83.

The invention has significant advantages. The circuit continuously senses voltage differential between the conductors and prevents restarting the motor as long as it is spinning faster than a maximum amount that corresponds to very slow backspin. The circuitry allows the operator to set the maximum tolerable backspin before restarting. All of the components are conventional, with amplifiers 39, 65 and 83 preferably being Norton operator amplifiers marketed under number LM3900.

While the invention has been shown in only one of its forms, it should be apparent to those skilled in the art that it is not so limited but is susceptible to various changes and modifications without departing from the spirit of the invention.

I claim:

1. Means for preventing restarting of a submersible pump AC electric motor while backspinning, comprising:
    a pair of leads, each connected to one of two motor power connectors for sensing AC voltage differential between the power conductors;
    amplifying means connected to the leads for amplifying the AC voltage differential sensed and producing direct current voltage pulses;
    time constant means for providing each of the pulses with a decay time constant, resulting in a corresponding voltage;
    reference means for providing a level DC reference voltage proportional to a voltage produced by the motor while backspinning at a selected maximum amount tolerable when restarting;
    comparison means for comparing the amplitude of the corresponding voltage to the reference voltage;
    disabling means for restarting when the amplitude of the corresponding voltage exceeds the reference voltage, and enabling restarting when the peak amplitude of the corresponding voltage drops below the reference voltage; and
    the time constant being selected so that the amplitude of the corresponding voltage will not decay below the reference voltage during the interval in which the motor pauses between ceasing to forward spin and commencing to backspin.

2. In a submersible pump system having an electrical motor located in the well for rotatably driving a centrifugal pump, means for preventing restarting of the motor while spinning after the power is cut off, comprising:
    sensing means for sensing residual voltage generated by the motor while spinning with the power off;
    disabling means for preventing restarting when the residual voltage sensed indicates spinning above a tolerable amount is still occuring; and
    means for preventing the disabling means from restarting during an interval that occurs when the motor pauses between forward spinning after power cutoff and reverse spinning due to a column of well fluid flowing back into the well.

3. In a submersible pump system having an electrical motor located in the well for rotatably driving a centrifugal pump, means for preventing restarting of the motor while spinning after the power is cut off, comprising;
    sensing means for sensing residual voltage generated by the motor while spinning with the power off;
    time constant means for sustaining at least a portion of the amplitude of the residual voltage sensed during an interval in which the motor pauses between forward spinning after power cutoff and reverse spinning due to a column of well fluid flowing back into the well;
    comparison means for determining whether the residual voltage output of the time constant means exceeds a reference voltage; and
    disabling means for preventing restarting when the residual voltage exceeds the reference voltage.

4. In a submersible pump system having an electrical motor located in a well for rotatably driving a centrifugal pump, means for preventing restarting of the motor while spinning after the power is cut off, comprising:
    sensing means for sensing residual voltage generated by the motor while spinning with the power off and for producing a DC corresponding voltage;
    time constant means for sustaining at least a portion of the amplitude of the corresponding voltage for a duration greater than the expected pause that occurs when the motor pauses between forward spinning after power cutoff and reverse spinning due to a column of well fluid flowing back into the well;
    reference means for providing a DC reference voltage proportional to a voltage produced by the motor while spinning at a selected maximum amount tolerable when restarting;
    comparison means for comparing the amplitude of the corresponding voltage to the reference voltage; and
    disabling means for preventing restarting when the amplitude of the corresponding voltage exceeds the reference voltage, and enabling restarting when the amplitude of the corresponding voltage drops below the reference voltage.

5. In a submersible pump system having an electrical motor located in a well for rotatably driving a centrifugal pump, means for preventing restarting of the motor while spinning after the power is cut off, comprising:
    sensing means for sensing AC residual voltage generated between two power conductors of the motor while spinning with the power cut off;
    amplifying means for amplifying the AC residual voltage sensed and for producing corresponding DC voltage pulses;
    integrating means for integrating the DC voltage pulses to provide a corresponding voltage that is proportional to the amplitude of the pulses;

reference means for producing a level DC reference voltage proportional to a voltage produced by the motor while spinning without power at a selected maximum amount tolerable for restarting;

comparison means for comparing the amplitude of the corresponding voltage to the reference voltage; and disabling means for preventing restarting when the amplitude of the corresponding voltage exceeds the reference voltage, and enabling restarting when the amplitude of the corresponding voltage drops below the reference voltage;

the integrating means having a time constant selected so that the amplitude of the corresponding voltage will not decay below the reference voltage during an interval in which the motor pauses between forward spinning after power cutoff and reverse spinning due to a column of well fluid flowing back into the well.

* * * * *

UNITED STATES PATENT OFFICE
CERTIFICATE OF CORRECTION

Patent No. 4,410,845          Dated October 18, 1983

Inventor(s) KEVIN W. LOCKYEAR

It is certified that error appears in the above-identified patent and that said Letters Patent are hereby corrected as shown below:

At column 5, line 56, --preventing-- should be inserted before "restarting".

Signed and Sealed this

Twenty-seventh Day of March 1984

[SEAL]

Attest:

GERALD J. MOSSINGHOFF

Attesting Officer    Commissioner of Patents and Trademarks